United States Patent [19]

Appleby et al.

[11] 3,841,589

[45] Oct. 15, 1974

[54] ACTUATING ARRANGEMENTS FOR AIRCRAFT CONTROL SURFACES

[75] Inventors: Brian Lawrence Appleby, Wolverhampton; Alan Malpass, Dudley; Kenneth Harold Ellis, Wolverhampton, all of England

[73] Assignee: Lucas Aerospace Limited, Birmingham, England

[22] Filed: Sept. 25, 1972

[21] Appl. No.: 291,534

[52] U.S. Cl. ............ 244/77 F, 244/76 R, 318/654, 318/655
[51] Int. Cl. ............................................ B64c 13/18
[58] Field of Search.... 244/42 D, 76 R, 76 A, 77 R, 244/77 E, 77 F, 77 G, 77 M; 318/580, 625, 654–655

[56] References Cited
UNITED STATES PATENTS
2,809,736 10/1957 Hoover ........................ 244/42 D X

| | | | |
|---|---|---|---|
| 2,961,202 | 11/1960 | Summerlin ........................ 244/77 G |
| 3,272,459 | 9/1966 | Madelung et al. ............... 244/77 M |
| 3,454,849 | 7/1969 | Kirchhein et al. ............ 244/77 M X |
| 3,708,735 | 1/1973 | Baltrop ........................ 244/77 M X |

Primary Examiner—Trygve M. Blix
Assistant Examiner—Stephen G. Kunin
Attorney, Agent, or Firm—Holman & Stern

[57] ABSTRACT

An actuating arrangement for lift control surfaces on each of a pair of aircraft wings has a pair of transmissions associated with the respective wings and drive apparatus for the transmissions, responsive to a control apparatus. A pair of synchro generators are respectively driven by the transmissions. Each of a pair of differential synchro generators is respectively responsive to the position of one of transmissions and to a signal from the synchro generator, driven by the other transmissions. Switch apparatus are responsive to the signals from the differential generators to arrest the transmissions if there is a substantial difference between their driven positions.

11 Claims, 2 Drawing Figures

3,841,589

ACTUATING ARRANGEMENTS FOR AIRCRAFT CONTROL SURFACES

This invention relates to actuating arrangements for aircraft control surfaces.

According to the invention an actuating arrangement for lift control surfaces on each of a pair of aircraft wings comprises drive means, a control apparatus, responsive to electrical control signals, for the drive means, first and second transmissions between the drive means and first and second control surfaces on the respective wings, first and second generating means coacting with the first and second transmissions respectively to provide first electrical signals respectively dependent on the driven positions of the said transmissions, third and fourth generating means coacting with the first and second transmissions respectively and responsive to said first electrical signals from said second and first generating means respectively to provide second electrical signals dependent on a difference between the driven positions of the transmissions, and first and second switch means operable in response to said electrical signals, said control apparatus being responsive to said second electrical signals and being effective to arrest the said transmissions when both said switch means are operated.

An example of the invention will now be described with reference to the accompanying drawings in which.

Figure 1:
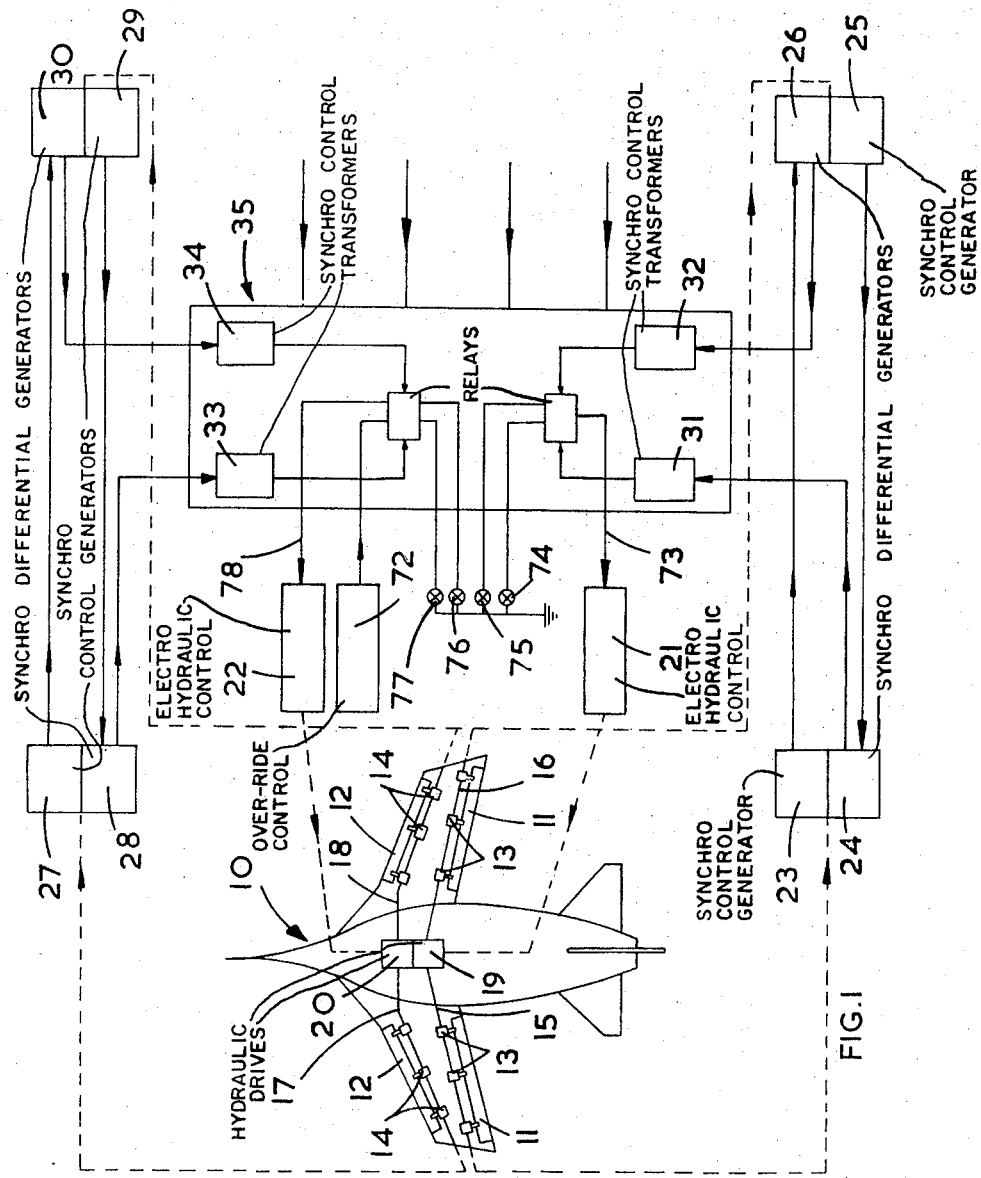
FIG. 1 is a block diagram of the arrangement as a whole.

An aircraft 10 has its wings provided at their trailing edges with extensible flaps 11 and at their leading edges with extensible slats 12. Flaps 11 and slats 12 respectively are extensible and retractable by means of a plurality of screw jacks 13, 14. Jacks 13 are driven by transmissions shafts 15, 16 on the port and starboard wings respectively of the aircraft. Jacks 14 are driven by shafts 17, 18 on the port and starboard wings respectively. Shafts 15, 16 are rotatable by a hydraulic motor 19 and shafts 17, 18 by a hydraulic motor 20. Motors 19, 20 are respectively controlled by electro-hydraulic control apparatus 21, 22, of the conventional type adapted to provide hydraulic output operating pressures in response to electrical input signals, such as, for example, the servo-valve arrangement disclosed in U.S. Pat. No. 3,390,613. Other suitable control apparatus of similar type can be found in U.S. Pat. Nos. 3,266,378; 3,411,410; and 3,702,575. Alternatively, such control apparatus can be that described in our British Patent specification No. 612309.

A synchro control generator 23 and a synchro differential generator 24 both have their rotors driven by the outboard end of shaft 15. A control generator 25 and a differential generator 26 are similarly driven by the outboard end of shaft 16. Control generator and differential generator pairs 27, 28 and 29, 30 are likewise driven by the outboard ends of shafts 17, 18 respectively. Stator windings of generators 23, 26 are interconnected, as are the stator windings of generators 24, 25, 27, 30 and 28, 29. The distribution and polarity of output signals from the rotors of differential generators 24, 26 are thus dependent on the difference, if any, between the driven positions of the outboard ends of shafts 15, 16. Output signals from differential generators 28, 30 are likewise dependent on the difference between the positions of the outboard ends of shafts 17, 18.

Figure 2:
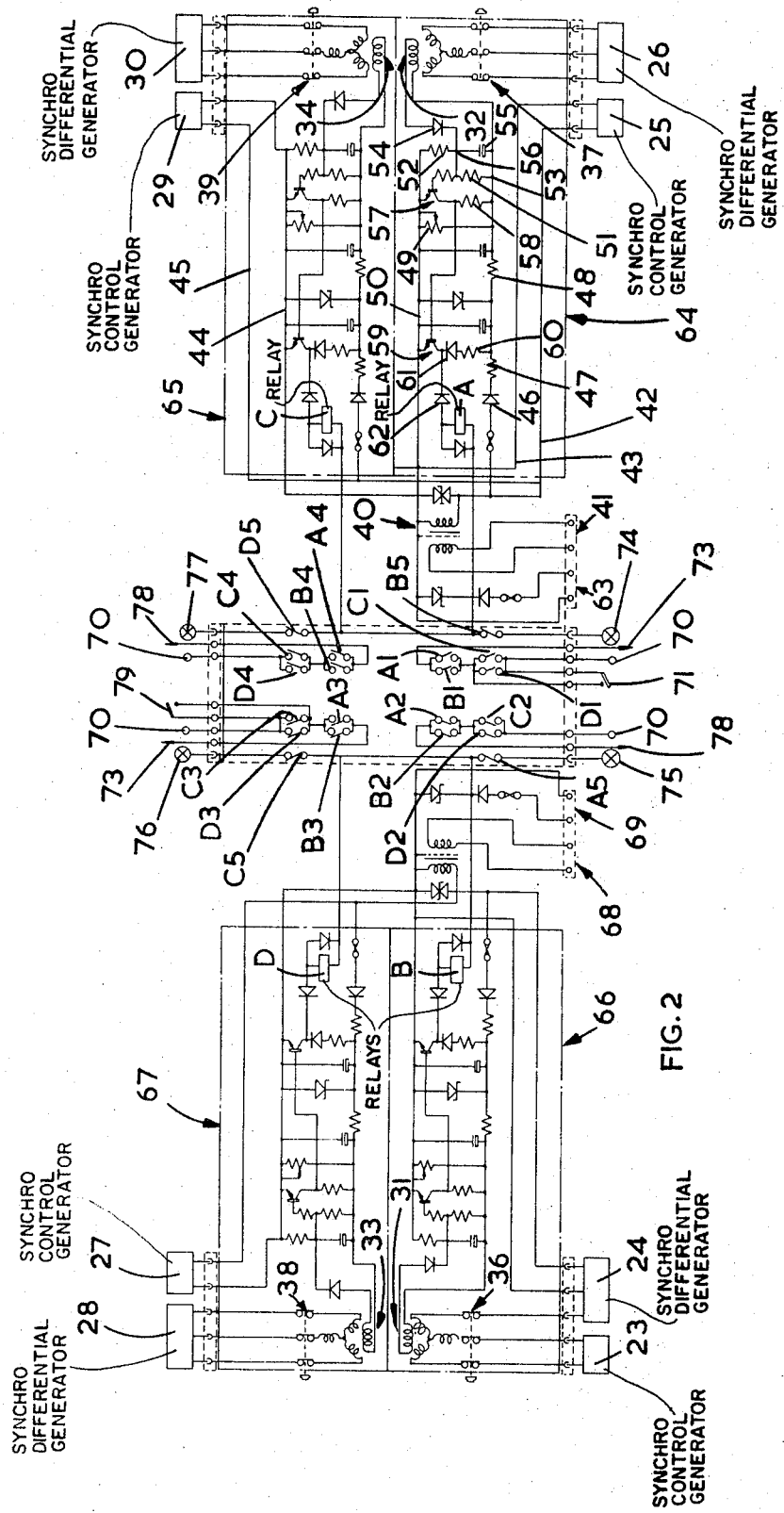
FIG. 2 shows details of a part of the arrangement of FIG. 1.

The outputs of generators 24, 26, 28, 30 are connected to the stator windings of respective synchro control transformers 31, 32, 33, 34 which form parts of an electronic switching unit 35, shown in greater detail in FIG. 2. Control transformers 31, 32, 33, 34 are set up so that there is an output signal of 15 volts when the associated transmission shafts are rotated symmetrically, this voltage reducing as shaft symmetry increases. Test switches 36, 37, 38, 39 are included in the supply lines to the respective control transformers 31, 32, 33, 34 whereby shaft symmetry may be simulated.

Current is supplied to the rotors of generators 25, 29 from a transformer 40 within unit 35 and energized by a 115 volt 400 Hz supply, indicated at 41. Transformer 40 has an output which is effectively regulated at a maximum of 26 volts by a zener diode. The 26 volts a.c. is supplied via lines 42, 43 and 44, 45 to the rotor windings of generators 25, 29 respectively. The 26 volts a.c. is rectified by diode 46 and current flows via fixed resistors 47, 48 and variable resistor 49 to an earth line 50. Current also flows to earth via resistors 51, 52 in parallel with resistor 49. The voltage at the common junction 53 of resistors 48, 49, 51 is set by resistor 49 to a value of 15 volts or just below.

The output signal from control transformer 32 is rectified by diode 54 and capacitor 55 and applied to the junction 56 of resistors 51, 52. An NPN transistor 57 has its base connected to junction 56, its emitter connected to line 50, and its collector connected via a resistor 58 to junction 53. A further NPN transistor 59 has its base connected to the collector of transistor 57, its emitter connected to line 50 and its collector connected to the junction of resistors 47, 48 via a resistor 60 and diode 61.

A relay A has its coil connected in series with a diode 62 between a 28 volt supply, indicated at 63, and the collector of transistor 59. The polarity of diode 61 is such as to prevent current flow from the 28 volt supply via resistor 60, and diode 62 prevents energisation of relay, A by the supply from transformer 40. Relay A has normally open contact pairs, A1, A2, A3, A4 and normally closed contacts A5.

Relay A and its associated circuit form a switching device 64. An identical switching device 65 is associated with control transformer 34 and is powered from supplies 41, 63. Device 65 includes a relay C having contacts C1, C2, C3, C4, C5 corresponding to the similarly numbered contacts of relay A.

Switching devices 66, 67 also identical to arrangement 65 are respectively associated with control transformers 31, 33 and include relays B and D respectively, each of relays B and D having five contact pairs corresponding to the contact pairs of the other relays. Switching devices 66, 67 are powered by a 115 volts 400 Hz supply 68 and a 28 volt D.C. supply 69. Supplies 68, 69 are independent of supplies 41, 63.

A 28 volt supply 70 has contacts C1, D1 connected to it in parallel. Contacts A1, B1 are connected in parallel with each other and in series with the contacts C1, D1. A switch 71 is in parallel with contacts C1, D1 and forms part of a slat over-ride control 72 (FIG. 1). The junction of contacts A1, B1 remote from contacts C1, D1 is connected to control apparatus 21 by a line 73, the arrangement being that a voltage on line 73 energises appropriate parts of apparatus 21 to enable motor 19 to be operated, and flaps 11 thereby removed. Contact B5 is between the 28 volt supply 63 and a cockpit warning lamp 74.

Contacts A5, C5 control respective warning lamps 75, 76 which are energisable from 28 volt supply 69. Contact D5 controls a warning lamp 77 energisable from 28 volt supply 63. Contact groups A2, B2, C2; A3, B3, C3, D3 and A4, B4, C4, D4 correspond to the contact group A1, B1, C1, D1 already described. Groups A2 etc. and A4 etc. control current flow from supply 70 via a line 78 to appropriate parts of apparatus 22, a voltage on line 78 enabling motor 20 to be energised to operate slats 12. Group A3 etc. is identical in function to group A1 etc., allowing the flaps 11 to be controlled and also including a switch 79 forming part of the over-ride control 72.

In use, when the output from control transformer 32 is 15 volts, the voltage at junction 56 will be zero or slightly negative. Transistor 57 will be reverse-biased and will not conduct. A positive voltage is thus applied to the base of transistor 59, which conducts to allow relay A to energise. If the voltage output from transformer 32 falls, the voltage at junction 56 becomes positive, switching on transistor 57 and causing transistor 59 to de-energise relay A. Relays B, C and D are similarly de-energised by a fall in the voltage output of the corresponding control transformers 36, 39, 38.

Thus, if there is asymmetry between the angular positions of the ends of shafts 15, 16, the output voltages from both of control transformers 31, 32 falls, relays A, B are de-energised, removing voltages from lines 73, 78 and rendering both motors 19, 20 inoperative. Similarly, of the outputs of transformers 33, 34 fall, relays C, D are de-energised to render both motors 19 20 inoperative.

If, however, as a result of malfunction of the apparatus one of relays A, B and/or one of relays C, D is de-energised, units 21, 22 and hence motors 19, 20 will continue to function, since the parallel contacts in each group will still be made. The appropriate warning lights will nevertheless be energised.

If, either or both of power supplies 41, 63 fails, relays A, C wil de-energise, lighting lamps 75, 76 but supplies to units 21, 22 will continue under control of relays B, D. Similarly, if either or both of supplies 68, 69 fails, motors 19 and 20 can continue to be operated providing that supplies 41, 63 continue.

If rotational asymmetry of slat transmission shafts, 17 18 cause lines 73, 78 to be de-energised, operation of the over-ride control 72 causes switches 71, 79 to by-pass the contacts C1, D1 and C3, D3, re-energising line 73 to operate the flaps 11.

The arrangement thus provides for the flaps 11 and slats 12 to be arrested in the case of true asymmetry, but merely provides a warning in the event of component or power failure in the detection apparatus.

We claim:

1. An actuating arrangement for lift control surfaces on each of a pair of aircraft wings, comprising drive means, a control apparatus, responsive to electrical control signals, for the drive means, first and second transmissions between the drive means and first and second control surfaces on the respective wings, first and second generating means coacting with the first and second transmissions respectively to provide first electrical signals respectively dependent on the driven positions of the said transmissions, third and fourth generating means coacting with the first and second transmissions respectively and responsive to said first electrical signals from said second and first generating means respectively to provide second electrical signals dependent on a difference between the driven positions of the transmissions, and first and second switch means operable in response to said second electrical signals, said control apparatus being responsive to said second electrical signals and being effective to arrest the said transmissions when both said switch means are operated.

2. An arrangement as claimed in claim 1 in which said first and second generating means comprise synchro generators.

3. An arrangement as claimed in claim 2 in which said third and fourth generating means comprise synchro differential generators.

4. An arrangement as claimed in claim 3 in which the rotors of said first and third generating means are driven by an end of the first transmission remote from the drive means, and in which the rotors of said second and fourth generating means are driven by an end of the second transmission remote from the drive means.

5. An arrangement as claimed in claim 3 in which said switch means includes first and second synchro control transformers having stator windings connected to the respective rotor windings of said third and fourth generating means.

6. An arrangement as claimed in claim 5 in which said switch means also includes first and second switching devices responsive to substantial variations in output signals from said respective synchro control transformers to de-energise said control apparatus.

7. An arrangement as claimed in claim 6 in which said first and second switching devices respectively include first and second parallel prirs of contact breakers arranged to be opened in response to said output signal variations from the associated synchro control transformer.

8. An arrangement as claimed in claim 7 in which each of said first and second switching devices includes a warning device and a third contact breaker which is closed to energise said warning device in response to said output signal variations from the associated synchro control transformer.

9. An arrangement as claimed in claim 7 which includes third and fourth pairs of contact breakers, a further drive means, a further control apparatus for the drive means, third and fourth transmissions between said further drive means and third and fourth control surfaces on the respective wings, fifth and sixth generating means coacting with the third and fourth transmissions respectively to provide third electrical signals respectively dependent on the driven positions of said third and fourth transmissions, seventh and eighth generating means coacting with the third and fourth transmissions respectively and responsive to said third electrical signals from said sixth and fifth generating means respectively to provide fourth electrical signals dependent on the difference between the driven positions of said third and fourth transmissions, further switch means which includes fifth and sixth parallel pairs of contact breakers, said fifth and sixth pairs being respectively in series with said first and third pairs of contact breakers, seventh and eighth parallel pairs of contact breakers forming part of said further switch means and respectively in series with said second and fourth pairs of contact breakers, the arrangement being such that operation of either switch means to open its associated contact breakers can de-energise both control apparatuses.

10. An arrangement as claimed in claim 9 which includes first and second by-pass switches respectively in parallel with said fifth and eight contact breaker pairs, so that when said by-pass switches are closed operation of said further switch means to open said fifth, sixth, seventh and eighth contact breaker pairs does not de-energise the first-mention control apparatus.

11. An actuating arrangement for lift control surfaces on each of a pair of aircraft wings, comprising first and second drive means, first and second control apparatus, responsive to electrical control signals, for said first and second drive means respectively, first and second transmissions for connecting said first drive means to first and second control surfaces on the respective wings, third and fourth transmissions for connecting said second drive means to third and fourth control surfaces on the respective wings, first and second generating means co-acting with the first and second transmissions respectively to provide first electrical signals respectively dependent on the driven positions of said first and second transmissions, third and fourth generating means co-acting with said first and second transmissions respectively and responsive to said first electrical signals from said second and first generating means respectively to provide second electrical signals dependent on a difference between the driven positions of said first and second transmissions, first and second switch means operable in response to said second electrical signals, fifth and sixth generating means co-acting with the third and fourth transmissions respectively to provide third electrical signals respectively dependent on the driven positions of said third and fourth transmissions, seventh and eighth generating means co-acting with the third and fourth transmissions respectively and responsive to said third electrical signals from said sixth and fifth generating means respectively to provide fourth electrical signals dependent on a difference between the driven positions of said third and fourth transmissions, and third and fourth switch means operable in response to said fourth electrical signals, said first and second control apparatus being responsive to operation of said second and fourth electrical signals and being effective to arrest said transmissions when either said first and second or said third and fourth switch means are operated.

* * * * *